UNITED STATES PATENT OFFICE.

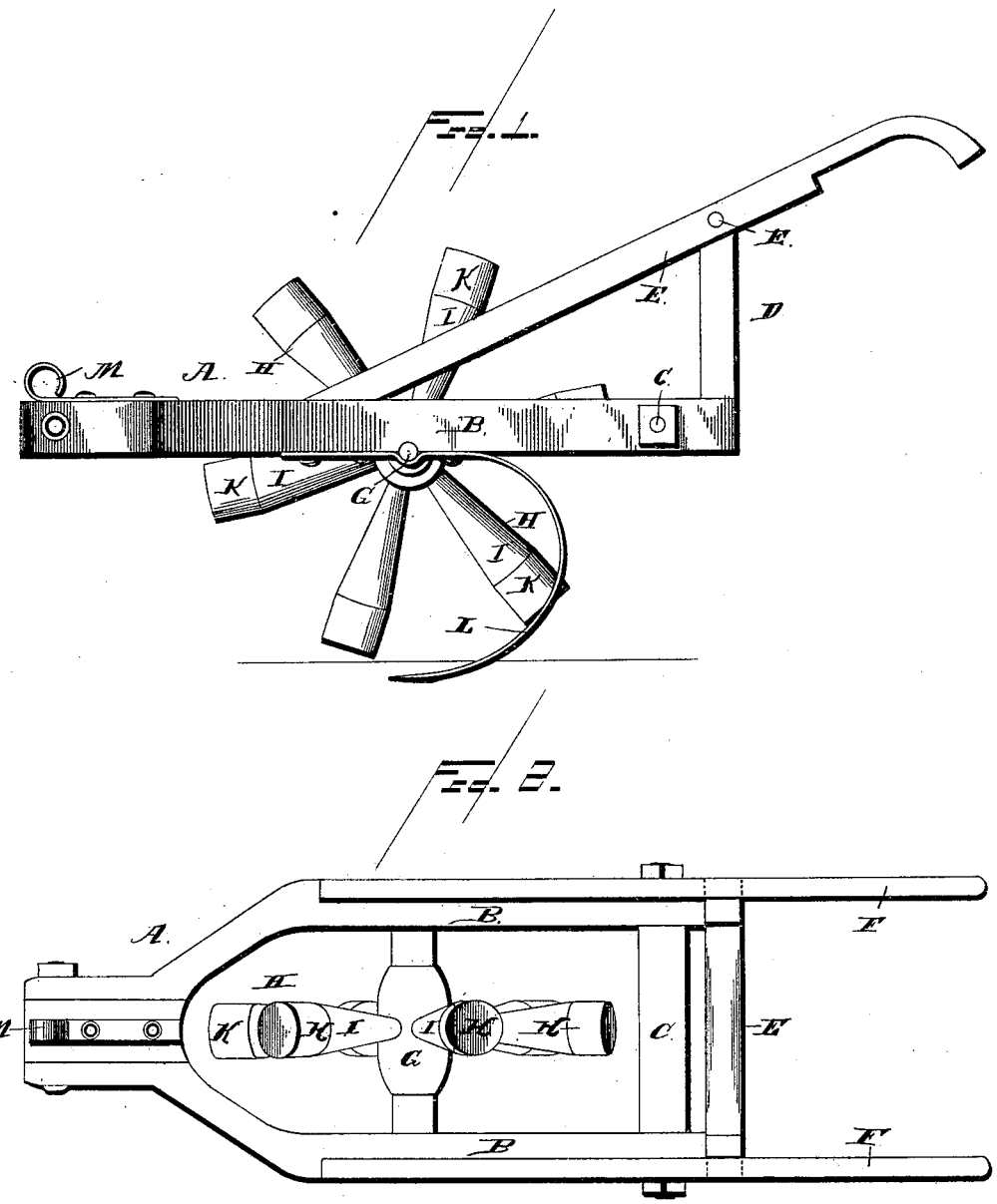

JEFFERSON B. KING, OF BALDWYN, MISSISSIPPI.

COTTON-CHOPPER.

SPECIFICATION forming part of Letters Patent No. 377,392, dated February 7, 1888.

Application filed October 14, 1887. Serial No. 252,364. (No model.)

*To all whom it may concern:*

Be it known that I, JEFFERSON B. KING, a citizen of the United States, residing at Baldwyn, in the county of Lee and State of Mississippi, have invented a new and useful Improvement in Cotton-Choppers, of which the following is a specification.

My invention relates to an improvement in cotton-choppers; and it consists in the peculiar construction and combination of devices, that will be more fully set forth hereinafter, and particularly pointed out in the claims.

In the accompanying drawings, Figure 1 is a side elevation of a cotton-chopper embodying my improvements. Fig. 2 is a top plan view of the same.

A represents the frame of the cotton-chopper, which comprises the side beams, B, having their front ends converged toward each other and united, as shown, and the cross-bar C, which connects the rear ends of the said beams B.

D represents a pair of standards which project vertically from the rear ends of the beams B, and have their upper ends connected by cross-bar E.

F represents a pair of handles which are similar to plow-handles, have their front ends secured to the beams B at a suitable distance from the front ends thereof, and are secured to the front ends of the standards D, as shown.

G represents an axle which is arranged transversely under the beams B, and has its ends journaled in suitable bearings under the same. To the center of this axle is rigidly secured a walking-wheel, H, having a series of radial arms, I, the outer ends of which are enlarged and flattened to form tamps K.

L represents a pair of covering-shovels, which are secured to the under sides of the beams B and have their upper arms arranged under the axle G, thereby serving to keep the axle in its bearings. A suitable hook or clevis, M, is attached to the front meeting ends of the beams B, and is adapted for the attachment of a team of draft-animals.

The operation of my invention is as follows: When the cotton is large enough to be chopped or thinned out, the machine is drawn along each row of cotton-plants, and is so directed by the operator that the walking-wheel is caused to run directly over the plants. As each arm or tamp of the walking-wheel comes in contact with the earth it covers a sufficient number of the cotton-plants to form a "stand," presses the said plants to the ground, and tamps the earth firmly around them. The covering-shovels, which are arranged on each side of the walking-wheel, throw earth from opposite sides of the row onto the plants which intervene between the stands preserved by the radial arms or tamps and completely cover the said intervening tamps with earth, thereby effectually destroying them. It will be readily understood that the radial arms or tamps of the walking-wheel prevent the earth from being thrown onto the plants which they cover, and consequently the said plants or stands are preserved.

Although the radial arms or tamps press the plants with which they come in contact to the ground, they do not injure them, and the said plants will be as erect and vigorous as ever within twenty-four hours after the machine has passed over them. Moreover, as the tamps press the soil firmly around the plants which are preserved, the soil is thereby rendered more compact, which is a condition favorable to the retention of moisture, and thereby greatly promotes the growth of the plants.

Having thus described my invention, I claim—

1. In a cotton-chopper, the rotating wheel having the radial arms or tamps, for the purpose set forth, substantially as described.

2. In a cotton-chopper, the combination of the frame having the covering-shovels and the wheel journaled in the said frame, arranged between the covering-shovels, and provided with the radial arms or tamps, substantially as described.

In testimony that I claim the foregoing as my own I have hereto affixed my signature in presence of two witnesses.

JEFFERSON B. KING.

Witnesses:
 CHALMERS GORDON,
 J. W. LEWELLEN.